(No Model.) 2 Sheets—Sheet 1.

D. J. McCARTHY.
PARCEL CARRIER.

No. 606,571. Patented June 28, 1898.

WITNESSES
H. A. Lamb
S. V. Holey

INVENTOR
Daniel J. McCarthy
By A. M. Wooster
Atty.

(No Model.) 2 Sheets—Sheet 2.

D. J. McCARTHY.
PARCEL CARRIER.

No. 606,571. Patented June 28, 1898.

WITNESSES
H. A. Lamb
S. V. Foley

INVENTOR
Daniel J. McCarthy
By A. M. Wooster
Atty.

THE NORRIS PETERS CO., PHOTO-LITHO., WASHINGTON, D. C.

UNITED STATES PATENT OFFICE.

DANIEL J. McCARTHY, OF ANSONIA, CONNECTICUT.

PARCEL-CARRIER.

SPECIFICATION forming part of Letters Patent No. 606,571, dated June 28, 1898.

Application filed February 2, 1898. Serial No. 668,801. (No model.)

*To all whom it may concern:*

Be it known that I, DANIEL J. MCCARTHY, a citizen of the United States, residing at Ansonia, county of New Haven, State of Connecticut, have invented a new and useful Parcel-Carrier, of which the following is a specification.

My invention has for its object to provide a parcel-carrier for bicycles which may be produced at very low cost, so as to place it within the reach of all, which may be applied to the rear fork of any bicycle and by any person without other tools than a screw-driver, which will carry a parcel of any size and weight within reasonable limits, and which when not in use may be folded up close to the fork and entirely out of the way.

With these ends in view I have devised the simple and novel construction which I will now describe, referring by letters and figures to the accompanying drawings, forming part of this specification, in which—

Figure 1:
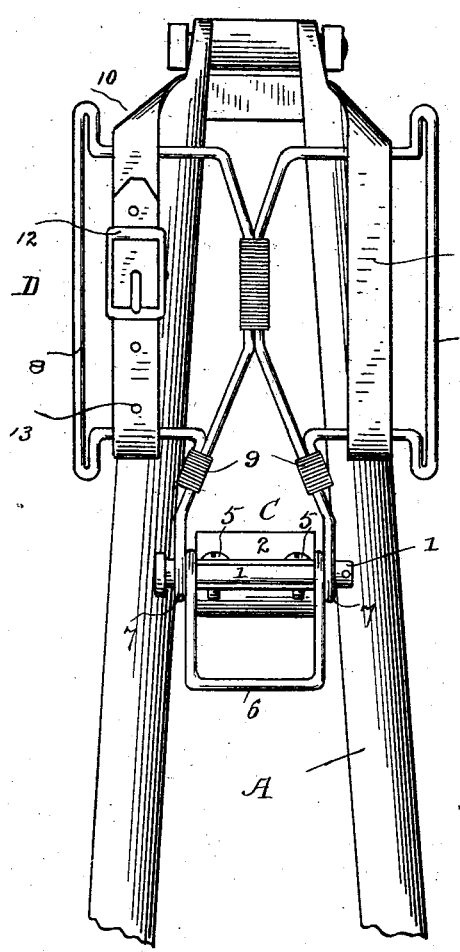
Figure 2:
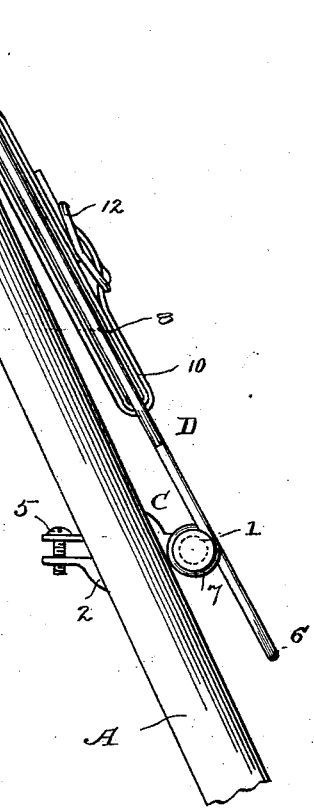
Figure 3:
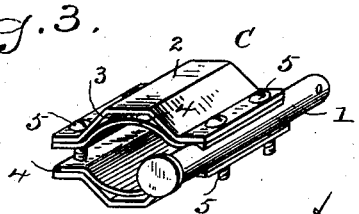
Figure 4:
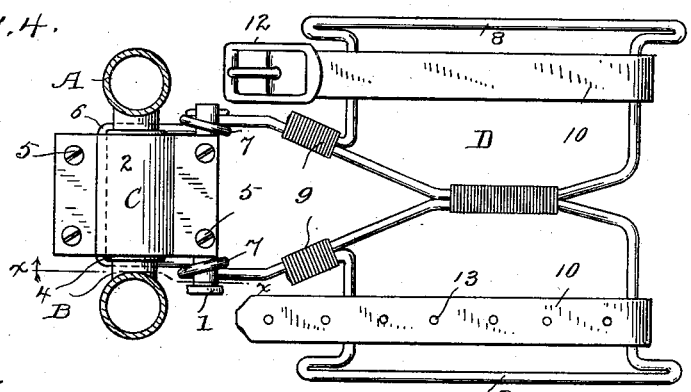
Figure 5:
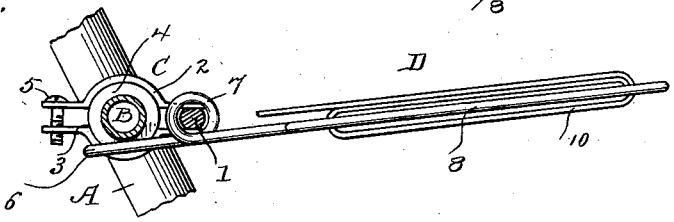
Figure 6:
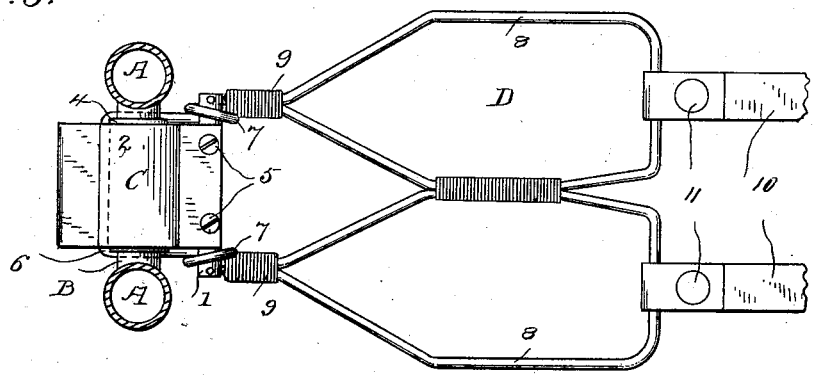
Figure 7:
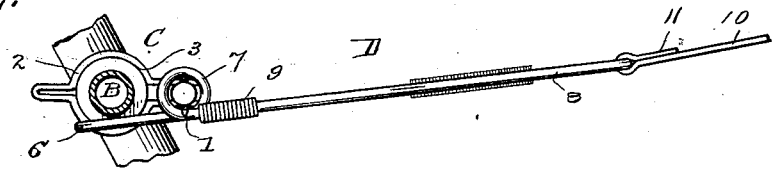

Figure 1 is an elevation illustrating my novel parcel-carrier in position on the rear fork of a bicycle and folded up against the fork as when not in use; Fig. 2, a side elevation corresponding therewith; Fig. 3, a perspective illustrating a modified form of clamp detached; Fig. 4, a plan view of my novel parcel-carrier in position for use, the fork of the bicycle appearing in section; Fig. 5, an edge view corresponding with Fig. 4; and Figs. 6 and 7 are views corresponding with Figs. 4 and 5, except that the straps are unwound and showing a slightly-different style of pivoted shelf or bracket.

A denotes the rear fork of a bicycle and B the usual cross-piece to which my novel parcel-carrier is affixed. The parcel-carrier comprises a clamp C, which carries a stud 1 and a shelf or bracket D, which is pivoted on said stud. The clamp consists of upper and lower arms, both of which are outwardly curved to form recesses 3 to receive a spring or springs 4. The arms of the clamp may be made independent of each other and secured together by screws 5 on each side of the cross-piece, as in Figs. 2, 3, 4, and 5, or, if preferred, both arms may be formed from a single piece of sheet metal, as shown in Figs. 6 and 7. The spring may be a block of rubber or piece of rubber tubing, as in Figs. 5 and 7, or, if preferred, two curved metallic springs may be used, as in Fig. 3. The stud 1 is locked in position between the arms of the clamp by screws 5. The exact shape in which the shelf or bracket is made is not of the essence of my invention. In practice I preferably make the shelf or bracket of a single piece or blank of wire, which I bend at its mid-length to form a loop 6, which is adapted to engage the under side of the bracket and serve as a stop to limit the downward movement of the self or bracket when lowered to the operative position. Each strand of the wire is then wound about the stud near the opposite ends thereof, forming eyes 7, upon which the shelf or bracket oscillates. Beyond eyes 7 the two strands of wire are bent to suitable shape to form two wings 8, which comprise the shelf or bracket, the ends of the blank being bent inward and suitably secured, as at 9. As already stated, however, the special shape in which the wire is bent to form the wings is not of the essence of my invention. For example, I have practically tested the forms illustrated in Figs. 4 and 6 and find both forms perfectly satisfactory in use. 10 denotes straps or tapes the ends of which may be secured in any suitable manner. In the present instance I have shown each of the wings as provided with a strap suitably secured thereto, as at 11, the free end of one strap being provided with a buckle 12 and the other with holes 13, adapted to be engaged by the tongue of the buckle. Tapes may be substituted for the straps, if preferred, and secured by clamps or buckles or by tying, as preferred. These being ordinary means of securing tapes and straps are not thought to require illustration in the drawings.

The operation is as follows: The user loosens enough of the screws 5, depending, of course, upon the special construction of the clamp, to permit the arms of the clamp, with the spring or springs between them, to be placed on opposite sides of the cross-piece of a bicycle-fork. The screws are then tightened up, causing the spring or springs to clamp the cross-piece firmly and lock the clamp in position. When not in use, the shelf or bracket is turned up against the fork, as in Figs. 1 and 2, and secured there by passing the free ends of the straps or tapes about the fork and securing them, as is clearly shown. When it is desired to use the carrier, the straps are detached from the fork and the shelf or bracket oscillated on the stud and allowed to drop down until the downward movement is stopped by the engagement of stop 6 with the clamp. The articles to be carried upon the shelf or bracket may be secured there by the straps or tapes in the usual manner.

Having thus described my invention, I claim—

1. A parcel-carrier for bicycles comprising a clamp provided with a stud 1, means for securing said clamp in place and a shelf or bracket formed from a single blank of wire pivoted on said stud and provided with a loop 6 formed from the mid-length of the blank which serves as a stop to limit the downward movement of the shelf or bracket when moved to operative position, said shelf or bracket being adapted to be folded up against the bicycle-fork when not in use.

2. The combination with clamp C consisting of upper and lower arms, a spring, a stud 1 and screws by which the stud is locked between the arms and the clamp is secured in place, of a shelf or bracket pivoted on said stud and provided with a loop 6 which engages the clamp to limit the downward movement of the shelf or bracket and straps by which parcels are held upon the shelf or bracket and the latter is held against the bicycle-fork when not in use.

In testimony whereof I affix my signature in presence of two witnesses.

DANIEL J. McCARTHY.

Witnesses:
ALBERT F. SPENCER,
JOHN E. WINGOOD.